Patented Sept. 26, 1950

2,523,266

UNITED STATES PATENT OFFICE 2,523,266

OPHTHALMIC GLASS

William H. Armistead, Corning, N. Y., assignor to Corning Glass Works, Corning, N. Y., a corporation of New York No Drawing. Application November 22, 1948, Serial No. 61,527

7 Claims. (Cl. 106—53)

This application is a continuation in part of my pending application Serial Number 758,233, filed June 30, 1947, and relates to transparent ophthalmic glasses, small buttons of which are to be sealed into lenses of crown glass for the production of multifocal spectacle lenses. Glasses which are to be used for this purpose must meet certain requirements. Above all, they must seal properly with standard white optical crown glass which has a thermal expansion coefficient of $93 \times 10^{-7}$ cm. per cm. per degree C. and a softening point of about 725° C. Softening point is that temperature at which a fibre of the glass of specified size will elongate under its own weight at a given rate when suspended through a small furnace of specified dimensions (Viscosity of Glass Between the Strain Point and Melting Temperature, by H. R. Lillie, Jour. Am. Cer. Soc., vol. 14, page 502, July 1931). They must have good devitrification resistance during sealing and adequate chemical durability or resistance to weathering. Their purpose requires an index of refraction for the D line ($nD$) between 1.57 and 1.70 and it is desirable that they have a dispersive index ($\nu$) which is as high as possible. Prior ophthalmic glasses of high refractive index have a maximum dispersive index of about 32 which is less than desired. The prior glasses of lower refractive index have a maximum dispersive index of about 50 but have insufficient chemical durability.

The primary object of this invention is to provide ophthalmic glasses which have higher dispersive indices than have hitherto been obtainable in glasses of this type without sacrifice of other desirable properties.

Another object is to provide ophthalmic glasses having optical properties ranging from $nD=1.70$, preferably $nD=1.65$, $\nu=46$, to $nD=1.57$, preferably $nD=1.59$, $\nu=53$, but having at the same time good chemical durability, softening points below 700° C. and thermal expansion coefficients between 83 and $95 \times 10^{-7}$ cm. per cm. per degree C.

In general, I have found that the above objects may be attained with glasses comprising 33% to 60% $SiO_2$, 1% to 7% $B_2O_3$, 2% to 15% $ZrO_2$, 0% to 28% BaO, .3% to 5% $Li_2O$, 1% to 15% $Na_2O$, 0% to 18% PbO, and containing ZnO and CaO totaling together at least 3% but individually amounting to less than 3%, the glasses containing at least three bivalent metal oxides, the total percentage of such bivalent metal oxides being between 15% and 50%. In lieu of $Na_2O$, $K_2O$ may be substituted wholly or in part.

For the present purpose the outstanding fault of prior glasses is their high dispersion for light of different wave lengths, that is, their low dispersive index, which causes excessive color aberration. Although it may be absent, the present glasses preferably should contain at least 5% BaO, because BaO raises the refractive index without unduly lowering the dispersive index. More than 28% BaO may cause devitrification. The use of BaO in substantial amounts tends to raise the liquidus temperature of the glass objectionably, but the presence of CaO and ZnO or PbO counteracts this. The presence of PbO is desirable also, because it raises the refractive index and helps to soften the glass. Since PbO tends to lower the dispersive index excessively, not more than about 18% thereof should be used.

CdO and SrO also raise the refractive index. They are particularly valuable for further increasing the refractive index without causing devitrification in glasses having large BaO contents. Up to 15% of each may thus be employed.

Other oxides, if desired, may be added with benefit as follows: up to 8%, but preferably not over 5%, $Al_2O_3$ may be added, preferably but not necessarily in lieu of $SiO_2$. Such addition increases the resistance of the glass to devitrification.

$TiO_2$ may be incorporated in the glass with advantage to the optical properties and chemical durability. Both $TiO_2$ and $ZrO_2$ tend to raise the refractive index of the glass more than the other constituents but, whereas $ZrO_2$ has only a slight effect on the dispersive index, $TiO_2$ has a strong depressing effect on it. Hence I prefer to use as much $ZrO_2$, between 2% and 15%, as will dissolve in the glass and to add as much $TiO_2$ as possible without unduly lowering the dispersive index. Up to about 10% $TiO_2$ may thus be added.

The expansion coefficient for suitable sealing to the standard optical crown glass will vary somewhat with softening point and with composition, and the new glasses will seal satisfactorily if their expansion coefficients are between $83\times10^{-7}$ and $95\times10^{-7}$ cm. per cm. per degree C.

The following compositions in weight percentage as calculated from their batches are given by way of example but not as limitations of the invention:

|  | 1 | 2 | 3 | 4 | 5 | 6 |
|---|---|---|---|---|---|---|
| $SiO_2$ | 45.8 | 45.5 | 36.2 | 40.5 | 37.3 | 35.3 |
| $ZrO_2$ | 7.4 | 7.4 | 8 | 7 | 7 | 7 |
| $TiO_2$ | 1.6 | 1.6 | 4.5 | 9 | 3.5 | 3.5 |
| $B_2O_3$ | | | 5 | 4 | 4.3 | 4.3 |
| CaO | 2.5 | 2.5 | 2 | 1 | 2.5 | 2.5 |
| ZnO | 1.5 | 1.5 | 1 | 2 | 2.5 | 2.5 |
| CdO | 6 | 6 | 7.5 | | | |
| BaO | 22.5 | 22.5 | 27 | 20 | 25 | 25 |
| $Na_2O$ | 6.7 | 4 | 7.8 | 8 | 7.4 | 6.4 |
| $K_2O$ | | 3 | | | | 1 |
| $Li_2O$ | 2 | 2 | 1 | 1 | .5 | .5 |
| SrO | | | | 2 | | |
| PbO | | | | 5.5 | 10 | 10 |
| $Al_2O_3$ | | | | | | 2 |
| $nD$ | 1.617 | 1.617 | 1.654 | 1.665 | 1.654 | 1.654 |
| $\nu$ | 51.2 | 51 | 45.3 | 40.5 | 43.2 | 43.1 |
| Softening point, °C | 661 | 670 | 665 | 680 | 680 | 683 |
| Exp. Coeff. x $10^7$ | 87 | 87 | 87 | 88 | 92 | 92 |

It is characteristic of the new glasses that they contain a substantial amount of $ZrO_2$. Commercial $ZrO_2$ sometimes contains a small amount of uranium as an impurity which is sufficient to cause fluorescence in bright light. This sometimes creates the appearance of an objectionable fog or haziness before the eyes when spectacle lenses composed of such glasses are worn in strong light. I have found that the objectionable fluorescence can be prevented by melting the glass under reducing conditions or by the addition of a small amount of $SnO_2$. The latter decomposes sufficiently during melting to cause reduction of the uranium to a lower valence which does not fluoresce.

I claim:

1. An ophthalmic glass which comprises 33% to 60% $SiO_2$, 1% to 7% $B_2O_3$, 2% to 15% $ZrO_2$ 0.3% to 5% $Li_2O$, 1% to 15% of an alkali metal oxide selected from the group consisting of $Na_2O$, $K_2O$, and mixtures of $Na_2O$ and $K_2O$, and at least three bivalent metal oxides in the indicated proportions selected from the group consisting of up to 18% PbO, up to 28% BaO, up to 15% CdO, up to 15% SrO, and at least 3% of a mixture of ZnO and CaO, the maximum proportion of either ZnO or CaO in said mixture being less than 3%, the selected bivalent metal oxides including the mixture of ZnO and CaO in the above-indicated proportion, the total percentage of bivalent metal oxides being 15% and 50%, the softening point being below 700° C., the refractive index ($nD$) being between 1.57 and 1.70, and the thermal expansion coefficient being between $83\times10^{-7}$ and $95\times10^{-7}$ cm. per cm. per °C. between 0° and 300° C.

2. An ophthalmic glass which comprises 33% to 60% $SiO_2$, 1% to 7% $B_2O_3$, 2% to 15% $ZrO_2$ 0.3% to 5% $Li_2O$, 1% to 15% of an alkali metal oxide selected from the group consisting of $Na_2O$, $K_2O$, and mixtures of $Na_2O$ and $K_2O$, and at least three bivalent metal oxides in the indicated proportions selected from the group consisting of up to 18% PbO, 5% to 28% BaO, up to 15% CdO, up to 15% SrO, and at least 3% of a mixture of ZnO and CaO, the maximum proportion of either ZnO or CaO in said mixture being less than 3%, the selected bivalent metal oxides including BaO and the mixture of ZnO and CaO in the above-indicated proportions, the total percentage of bivalent metal oxides being between 15% and 50%, the softening point being below 700° C., the refractive index ($nD$) being between 1.57 and 1.70, and the thermal expansion coefficient being between $83\times10^{-7}$ and $95\times10^{-7}$ cm. per cm. per °C. between 0° and 300° C.

3. An ophthalmic glass which comprises 33% to 60% $SiO_2$, 1% to 7% $B_2O_3$, 2% to 15% $ZrO_2$, up to 8% $Al_2O_3$, 0.3% to 5% $Li_2O$, 1% to 15% of an alkali metal oxide selected from the group consisting of $Na_2O$, $K_2O$ and mixtures of $Na_2O$ and $K_2O$, and at least three bivalent metal oxides in the indicated proportions selected from the group consisting of up to 18% PbO, up to 28% BaO, up to 15% CdO, up to 15% SrO, and at least 3% of a mixture of ZnO and CaO, the maximum proportion of either ZnO or CaO in said mixture being less than 3%, the selected bivalent metal oxides including the mixture of ZnO and CaO in the above-indicated proportion, the total percentage of bivalent metal oxides being between 15% and 50%, the softening point being below 700° C., the refractive index ($nD$) being between 1.57 and 1.70, and the thermal expansion coefficient being between $83\text{x}10^{-7}$ and $95\text{x}10^{-7}$ cm. per cm. per °C. between 0° and 300° C.

4. An ophthalmic glass which comprises 33% to 60% $SiO_2$, 1% to 7% $B_2O_3$, 2% to 15% $ZrO_2$, up to 10% $TiO_2$, 0.3% to 5% $Li_2O$, 1% to 15% of an alkali metal oxide selected from the group consisting of $Na_2O$, $K_2O$ and mixtures of $Na_2O$ and $K_2O$, and at least three bivalent metal oxides in the indicated proportions selected from the group consisting of up to 18% PbO, up to 28% BaO, up to 15% CdO, up to 15% SrO, and at least 3% of a mixture of ZnO and CaO, the maximum proportion of either ZnO or CaO in said mixture being less than 3%, the selected bivalent metal oxides including the mixture of ZnO and CaO in the above-indicated proportion, the total percentage of bivalent metal oxides being between 15% and 50%, the softening point being below 700° C., the refractive index ($nD$) being between 1.57 and 1.70, and the thermal expansion coefficient being between $83\times10^{-7}$ and $95\times10^{-7}$ cm. per cm. per °C. between 0° and 300° C.

5. An ophthalmic glass which comprises 33% to 60% $SiO_2$, 1% to 7% $B_2O_3$, 2% to 15% $ZrO_2$, up to 8% $Al_2O_3$, up to 10% $TiO_2$, 0.3% to 5% $Li_2O$, 1% to 15% of an alkali metal oxide selected from the group consisting of $Na_2O$, $K_2O$ and mixtures of $Na_2O$ and $K_2O$, and at least three bivalent metal oxides in the indicated proportions selected from the group consisting of up to 18% PbO, up to 28% BaO, up to 15% CdO, up to 15% SrO, and at least 3% of a mixture of ZnO and CaO, the maximum proportion of either ZnO or CaO in said mixture being less than 3%, the selected bivalent metal oxides including the mixture of ZnO and CaO in the above-indicated porportion, the total percentage of bivalent metal oxides being between 15% and 50%, the softening point being below 700° C., the refractive index ($nD$) being between 1.57 and 1.70, and the thermal expansion coefficient being between $83\times10^{-7}$ and $95\times10^{-7}$ cm. per cm. per °C. between 0° and 300° C.

6. An ophthalmic glass which comprises 33% to 60% $SiO_2$, 1% to 7% $B_2O_3$, 2% to 15% $ZrO_2$, up to 10% $TiO_2$, 0.3% to 5% $LiO_2$, 1% to 15% of an alkali metal oxide selected from the group consisting of $NaO_2$, $K_2O$ and mixtures of $NA_2O$ and $K_2O$, and at least three bivalent metal oxides in the indicated proportions selected from the group consisting of up of 18% PbO, 5% to 28% BaO, up to 15% CdO, up to 15% SnO, and at least 3% of a mixture of ZnO and CaO, the maximum proportion of either ZnO or CaO in said mixture being less than 3%, the selected bivalent metal oxides including BaO and the mixture of ZnO and CaO in the above-indicated proportions, the total percentage of bivalent metal oxides being between 15% and 50%, the softening point being below 700° C., the refractive index ($nD$) being between 1.57 and 1.70, and the thermal expansion coefficient being between $83 \times 10^{-7}$ and $95 \times 10^{-7}$ cm. per cm. per °C. between 0° and 300° C.

7. An ophthalmic glass which comprises 33% to 60% $SiO_2$, 1% to 7% $B_2O_3$, 2% to 15% $ZrO_2$, up to 10% $TiO_2$, 0.3% to 5% $Li_2O$, 1% to 15% of an alkali metal oxide selected from the group consisting of $Na_2O$, $K_2O$ and mixtures of $Na_2O$ and $K_2O$, and at least four bivalent metal oxides in the indicated proportions selected from the group consisting of up to 18% PbO, 5% to 28% BaO, up to 15% CdO, up to 15% SnO, and at least 3% of a mixture of ZnO and CaO, the maximum proportion of either ZnO or CaO in said mixture being less than 3%, the selected bivalent metal oxides including PbO, BaO and the mixture of ZnO and CaO in the above-indicated proportions, the total percentage of bivalent metal oxides being between 15% and 50%, the softening point being below 700° C., the refractive index ($nD$) being between 1.57 and 1.70, and the thermal expansion coefficient being between $83 \times 10^{-7}$ and $95 \times 10^{-7}$ cm. per cm. per °C. between 0° and 300° C.

WILLIAM H. ARMISTEAD.

No references cited.

Certificate of Correction

Patent No. 2,523,266 September 26, 1950

WILLIAM H. ARMISTEAD

It is hereby certified that error appears in the printed specification of the above numbered patent requiring correction as follows:

Column 3, line 53, after the word "being" insert *between*; column 4, line 53, for "BbO" read *PbO*; line 68, for "LiO$_2$" read *Li$_2$O*; line 70, for "NaO$_2$" read *Na$_2$O*; line 74, and column 6, line 2, respectively, for "SnO" read *SrO*; and that the said Letters Patent should be read as corrected above, so that the same may conform to the record of the case in the Patent Office.

Signed and sealed this 20th day of February, A. D. 1951.

[SEAL]

THOMAS F. MURPHY,
*Assistant Commissioner of Patents.*